(12) United States Patent
Duff

(10) Patent No.: US 8,970,588 B1
(45) Date of Patent: Mar. 3, 2015

(54) SYSTEM AND METHODS FOR IMPLEMENTING OBJECT ORIENTED STRUCTURES IN A SHADING LANGUAGE

(75) Inventor: Thomas Douglas Selkirk Duff, Berkeley, CA (US)

(73) Assignee: Pixar, Emeryville, CA (US)

( * ) Notice: Subject to any disclaimer, the term of this patent is extended or adjusted under 35 U.S.C. 154(b) by 989 days.

(21) Appl. No.: 12/533,965

(22) Filed: Jul. 31, 2009

(51) Int. Cl.
*G06T 17/20* (2006.01)
*G06T 15/50* (2011.01)

(52) U.S. Cl.
USPC ........... 345/423; 345/426; 345/501; 345/506; 345/606

(58) Field of Classification Search
None
See application file for complete search history.

(56) References Cited

U.S. PATENT DOCUMENTS

| | | | |
|---|---|---|---|
| 7,477,255 B1 * | 1/2009 | Lindholm et al. | 345/501 |
| 2002/0118212 A1 * | 8/2002 | Lake et al. | 345/606 |
| 2004/0001062 A1 * | 1/2004 | Pharr | 345/426 |
| 2005/0212795 A1 * | 9/2005 | Anderson et al. | 345/419 |
| 2006/0055695 A1 * | 3/2006 | Abdalla et al. | 345/426 |
| 2007/0075998 A1 * | 4/2007 | Cook et al. | 345/426 |
| 2009/0322751 A1 * | 12/2009 | Oneppo et al. | 345/426 |
| 2010/0122243 A1 * | 5/2010 | Breton et al. | 717/163 |

FOREIGN PATENT DOCUMENTS

WO    WO 9506298 A1 *  3/1995  ............. G06T 15/50

OTHER PUBLICATIONS

Lensch, H. P. A., Kautz, J., Goesele, M., Heidrich, W., and Seidel, H.-P. 2003. Image-based reconstruction of spatial appearance and geometric detail. ACM Transactions on Graphics 22, 2.*
Lawrence, Jason, Aner Ben-Artzi, Christopher Decoro, Wojciech Matusik, Hanspeter Pfister, Ravi Ramamoorthi, and Szymon Rusinkiewicz. 2006. Inverse shade trees for non-parametric material representation and editing. ACM Transactions on Graphics 25(3): 735-745.*
Abram, G. D., & Whitted T. (1990). Building Block Shaders. SIGGROAH '90 Conference Proceedings, Computer Graphics, vol. 24:4, pp. 283-288.*
McCool, M., "Shading Language Overview," Apr. 26, 2004, located at <http://www.csee.umbc.edu/~olano/s2004c01/ch05.pdf>, last accessed on Nov. 3, 2009, pp. 5-1-5-4.

* cited by examiner

*Primary Examiner* — Ulka Chauhan
*Assistant Examiner* — Sultana M Zalalee
(74) *Attorney, Agent, or Firm* — Kilpatrick Townsend & Stockton LLP

(57) ABSTRACT

The efficiency of shading and rendering processes can be improved through implementing object oriented programming for shading program languages. Computer graphics data representing a geometric model in a scene are determined and assigned to object oriented classes and subclasses and are subsequently sorted and grouped into several (e.g., two or more) groups based on the classification information. Once the computer graphics data are assigned in a class and/or subclasses and grouped, a shader interpreter implements SIMD operators on each group of data values.

17 Claims, 4 Drawing Sheets

SYSTEM AND METHODS FOR IMPLEMENTING OBJECT ORIENTED STRUCTURES IN A SHADING LANGUAGE

BACKGROUND

The present invention relates to computer graphics and animation. More specifically, the present invention relates to techniques for processing object oriented representations of computer graphics data to render animated geometric model scenes using a shading language.

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene changes over time. A great deal of effort has been devoted to making realistic looking rendered images and animations.

In a typical shader language, a user (e.g., a programmer) can use surface attribute functions to define the values of attributes of surfaces in three-dimensional space. Such surface attribute functions can be evaluated at any point on the surface to provide corresponding attribute values at that point on the surface. Attributes of surfaces can include optical properties of a surface, such as color, transparency, reflectivity, and transmissivity. Attributes can also include visibility or occlusion information; artistically or procedurally generated texture data in one, two, three, or more dimensions; shadow generation information; illumination information, which specifies the amount and direction of light on the surface point from other portions of the scene; and rendering information, such as ray tracing path information or radiosity rendering information. Functions can be relatively simple, such as looking up texture data from a texture map, or very complex, such as the evaluation of a complex user-defined shader program, ray tracing program, animation or modeling program, or simulation program.

The process of rendering an image or frame of animation can be a very time-consuming process. Some shader interpreters, such as RenderMan™, use a SIMD (Single Instruction Multiple Datastream) architecture. A SIMD shading language interpreter is able to execute instructions once for a set of computer graphics data points, saving significantly over the redundant instruction dispatch of a conventional SISD (Single Instruction Single Datastream) architecture. However, in an object-oriented shading language, if per-point data of a particular class can have different subclasses at different points, then virtual methods may require different code to be executed at each point, negating the advantages of SIMD interpretation.

Accordingly, what is desired are improved methods and apparatus for solving some of the problems discussed above.

BRIEF SUMMARY

Methods and systems for object oriented programming are provided for shading program languages in order to improve the efficiency and expressiveness of shading and rendering processes. More specifically, computer graphics data representing a scene or one or more objects in a scene are assigned into object oriented classes and subclasses and are subsequently sorted and grouped into several groups based on the class and subclass information. Each group of computer graphics data points may share some attributes that are to be processed in a uniform or similar manner. Based on such attributes' values, computer graphics data points may be assigned into subclasses. Once the computer graphics data have been assigned to a class and/or subclass, a shader interpreter implements SIMD operators on each group of values separately.

According to one embodiment, a method is provided for executing render computations on computer graphics data. The method typically includes receiving computer graphics data for at least one geometric model, calculating values for the model object using the received data, and grouping the calculated values into at least two different groups. The method also typically includes executing a render method on the calculated values, wherein a first group of values are processed together and then a second group of values are processed together. In certain aspects, the calculated values belong to an object class having at least two subclasses, wherein the first group of values belong to a first subclass and wherein the second group of values belong to a second subclass. In certain aspects, executing includes providing the calculated values to a SIMD interpreter for shading, wherein the first subclass group is processed in the SIMD interpreter separately from the second subclass group. In certain aspects, grouping includes determining second values to be used for grouping the calculated values, and for each calculated value, assigning the calculated value to a subclass of the class based on the determined second values. In certain aspects, the second values are determined by a shader instruction. In certain aspects, the method includes rendering an output of the render method (e.g., of a SIMD interpreter) or rendering the model using an output of the render method (e.g., of the SIMD interpreter).

According to another embodiment, a computer readable medium is provided that stores code for executing render computations on computer graphics data. The code typically includes instructions which when executed by a processor cause the processor to calculate values of data points for a geometric model using computer graphics data for the model, to group the calculated values into at least two different groups, and to execute a render method on the calculated values, wherein a first group of values are processed together and then a second group of values are processed together.

According to yet another embodiment, a method is provided for processing computer graphics data points in object-oriented classes using a SIMD shading language interpreter. The method typically includes receiving computer graphics data points defining at least one geometric model in a scene, wherein attributes of the data for the at least one model correspond to a class having at least two subclasses, and providing the computer graphics data to the SIMD interpreter for shading, wherein data having attributes of the same subclass are provided to the SIMD interpreter together to be processed by the SIMD interpreter separately from data having attributes of a different subclass. In certain aspects, the method includes rendering an output of the SIMD interpreter or rendering the model using an output of the SIMD interpreter.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings, in which.

DETAILED DESCRIPTION

In certain embodiments, object oriented programming is used for shading program languages in order to improve the efficiency and expressiveness of the shading and/or rendering processes. In certain aspects, computer graphics data representing a geometric model in a scene are classified into object oriented classes and subclasses. These data are subsequently sorted and grouped into several groups (e.g., two or more) based on classification information. For example, each grouping of computer graphics data may include or share similar values of attributes that are to be processed in a uniform manner. Once the computer graphics data have been grouped in classes and/or subclasses, a shader interpreter implements SIMD operators separately for each group, advantageously amortizing computational resources.

As will be appreciated, in the object oriented programming paradigm, a class defines the abstract characteristics of an object, including attributes and methods (behaviours) of such object. Classes provide hierarchical structure and modularity in an object-oriented computer program. A class may have one or more subclasses, each of which inherits attributes and behaviors from its parent class(es). Although object oriented programming can be utilized for many processes throughout the image/animation production, the forgoing and described embodiments are explained in conjunction with a shader interpreter that evaluates shader program instructions, e.g., user-defined shader programs.

Figure 1A:
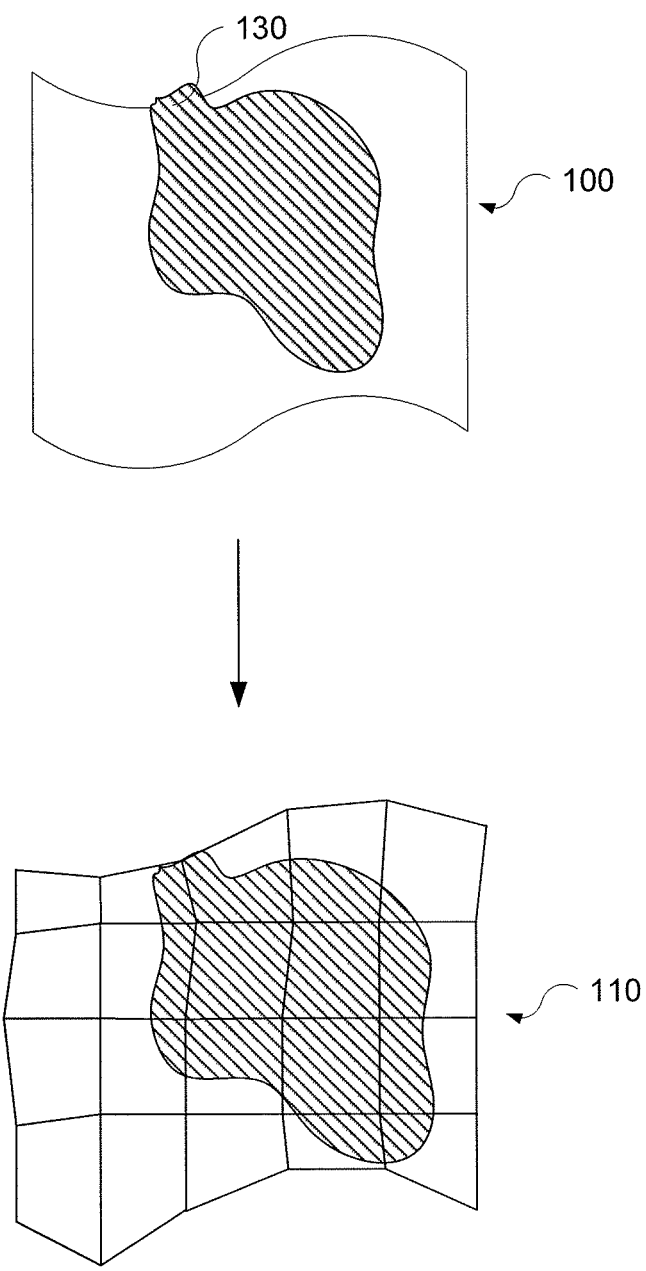
FIGS. 1A and 1B depict an example of an image patch that is diced into vertices that may be processed in a shader interpreter in accordance with one embodiment.
Figure 1B:
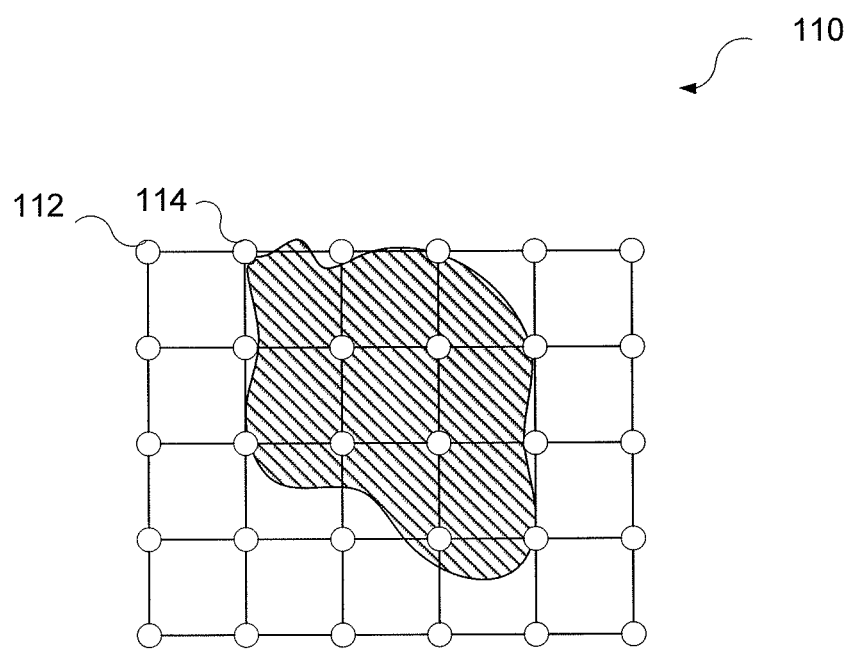

FIGS. 1A and 1B show an example of a patch of image 100 that is diced into a grid 110, including computer graphics data (e.g., vertices) for a shading process. Received computer graphics data might include data representing vertices 112, 114, as shown in FIG. 1B. In one embodiment, high-level primitives of an image are used to specify geometric primitives of the image. The shader system typically obtains an input primitive of the patch of image and divides the input primitive into polygons called micropolygons equal to or smaller than the pixel size. The input primitive may be divided into smaller primitives if the input primitive is not simple enough to process. Subsequently, the small primitive (or sub-primitive) may be diced so that the small primitive is converted into a common data format, called a "grid." A "grid," as used herein, refers to a tessellation of the primitive into an array of facets known as micropolygons. The vertices of theses facets may be the computer graphics data that is to be shaded. Each grid retains all of the input primitive's attributes, and any primitive vertex variables that were attached to the primitive have been correctly interpolated onto every vertex in the grid. The computer graphics data (e.g., vertices) of the grid are then passed into the shading system to be shaded. Various shaders, including displacement shaders, surface shaders, and light shaders, may be evaluated in a particular order by the shading system. As will be appreciated, the vast majority of shaders written for image production are surface shaders. Attributes of surfaces can include optical properties of a surface, such as color, transparency, reflectivity, and transmissivity. The goal of a surface shader is to compute the resulting color, opacity, and the position for a particular point on the grid.

Generally, the shading system is a runtime interpreter for a particular shader language. An example of a shading language is Pixar's RenderMan Shading Language. The data structure on which the shader interpreter operates may include arrays of data values representing attributes associated with points of the grid. Typical arrays might include position information, the surface normal and the color associated with each point. In some embodiments, the shader interpreter uses a SIMD (Single Instruction Multiple datastream) architecture. As used herein, a "SIMD interpreter" refers to a shader runtime interpreter that reads shader instructions one at a time and executes each instruction on all whole arrays of data values during the shading and rendering process.

As mentioned above, each grid retains all of the input primitive's attributes, and any primitive vertex variables that were attached to the primitive have been interpolated onto every vertex in the grid. In other words, a grid inherits its input primitive's attributes. To efficiently utilize the SIMD interpreter, the data provided to be shaded or rendered is sorted and grouped into subclasses of a particular class. In some embodiments, a grid that is diced from an input primitive of a graphic scene may be provided to the SIMD interpreter. Before the data is provided to the SIMD interpreter for a shading process, the received data values of the grid and/or data values calculated from the received data are sorted and grouped into subclasses. That is, data values associated with points of the grid are identified as being in a particular class and/or subclass. Data values of the same subclass are grouped together so that the SIMD interpreter can implement operations on each group of values in a SIMD manner.

For example, while the shader system evaluates surface shaders that include instructions for a type 'A' surface and different instructions for a type 'B' surface, data values associated with the surface type 'A' and data values associated with the surface type 'B' are grouped into corresponding subclass groups. Each group may be provided to the SIMD interpreter so that SIMD interpreter can uniformly execute operations on each group of values in an efficient manner. When executing an instruction, the SIMD interpreter executes a common method call once for each group of data values in the same subclass group.

As shown in FIG. 1, an input primitive 100 represents a metal surface but a small area 130 of the input primitive 100 has a high rust attribute value, representing a rusted area on the metal surface. For the sake of discussion, assume that a MetalSurface base class is associated with the data.

As one example, a class definition according to one embodiment might be written as:

```
class MetalSurface {
virtual Color shade(P)=0;
...
};
class Rust: MetalSurface{
virtual Color shade(P) {
    ... // calculate a rusty color
return rusty_color;
}
};
class Shiny: MetalSurface{
virtual Color shade(P){
    ... // calculate a shiny color
``` return shiny_color;
}
};

Using the class definition above, the shader instructions might be conveniently written as follows:

MetalSurface *surface;
if (rustiness(P)>threshold_value)
surface=new Rust(parameters);
else
surface=new Shiny(parameters);
...
Color=surface→shade(P);

The received data might explicitly include values associated with a rust attribute representing a level of rustiness of a grid point, or the data might include values upon which calculations are performed to determine the value of a rust attribute. To implement the above described instruction in a SIMD manner, the computer graphics data of the grid 110 are sorted based on a value of the rust variable and grouped into two different subclasses for example, a surface="shiny" subclass and a surface="Rust" subclass. At a high level, the conditions to classify (sort) the computer graphics data into different subclasses may be predefined, for example: if the rust variable has a higher value than a threshold, that value is assigned into the surface="Rust" subclass, otherwise the value is assigned into the surface="shiny" subclass. Such conditions can be defined as an invariant of each subclass of the "Metal Surface" class. Each group including values assigned to the same subclass may be provided to the SIMD interpreter together. To implement this, in certain aspects, a run flag array is generated to identify those values assigned to the same subclass. For example, for values assigned to the surface="shiny" subclass, a runflag array is generated that identifies these values. Subsequently, the runflag array is read to identify the values in the "shiny" subclass, which are then provided to the SIMD interpreter together and processed together (e.g., shade method(s) associated with the "shiny" subclass are called and evaluated on the subclass together). Similarly, values in the "Rust" subclass group are provided to the SIMD interpreter together and processed together (e.g., shade method(s) associated with the "rust" subclass are called and evaluated on the subclass together). In this manner, the SIMD interpreter is able to execute methods or operations particular to a subclass once on many data values, saving significantly over the redundant calculations.

Figure 2:
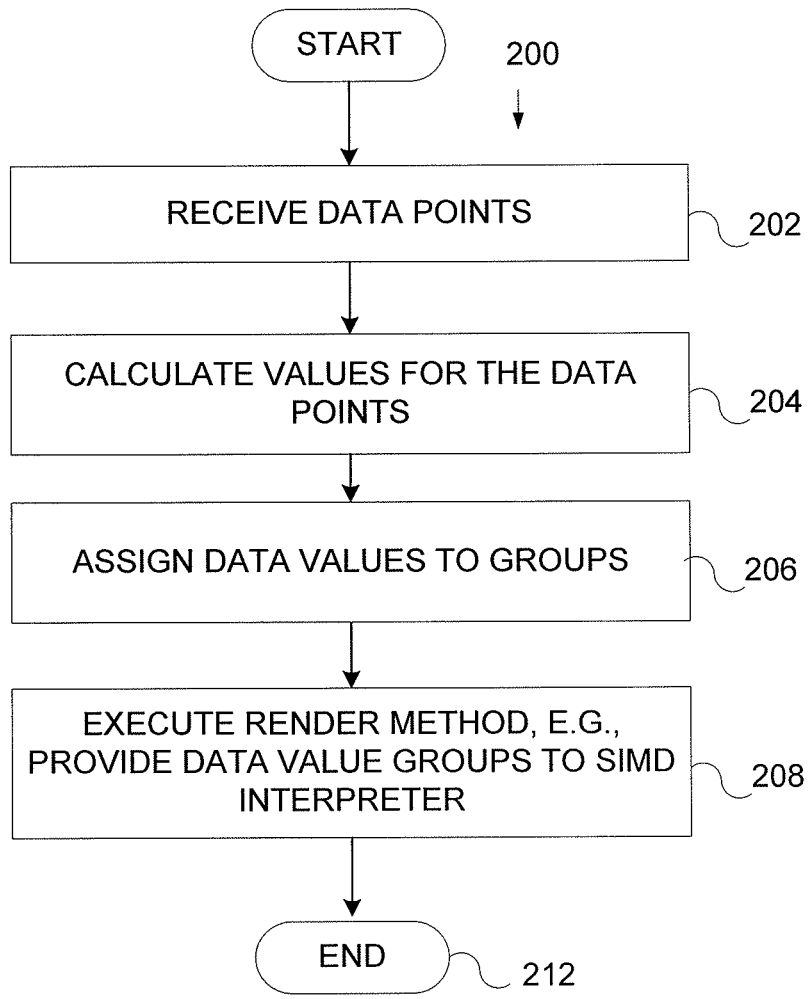
FIG. 2 is a flow diagram depicting a grouping process that may be used to practice various embodiments.

FIG. 2 is a flow diagram of a process 200 that may be used to practice various embodiments. Beginning with step 202, a set of computer graphics data that are to be shaded are received. For example, a grid that includes computer graphics data (e.g., data representing vertices, edges or faces on an object mesh or grid) for at least one geometric model may be received. In certain aspects, the received data may include surface parameters and/or data values representing attributes of the object such as colors, surface normals, textures, or illumination information. In step 204, values of data, or data values for attributes of data points, for the model object are calculated. These values may be determined by an instruction in a shader, or otherwise determined. For example, values associated with the vertices may be determined. Example calculations might include comparing a data value with a threshold value, arithmetic operations, texture lookups, geometric calculations, derivatives and other computations. In step 206, the calculated values (e.g., values associated with vertices or other data points) are grouped into at least two different groups. For example, as described above, object oriented classes and subclasses for the shader system may be predefined and stored in memory, and the calculated values are assigned to a subclass. A first group of values may belong to a first subclass and a second group of values may belong to a second subclass in the class hierarchy. Continuing with the above example, the value of a rust variable indicating a level of rustiness on a surface may be used to sort the computer graphics data for the grid. In that example, if the rust variable value of a grid point is more than a threshold, e.g., 0.5, the value is assigned to the Surface="Rust" subclass, if the rust variable value of a grid point is less than the threshold, the value is assigned to the surface="shiny" subclass.

At step 208, a render method is executed on the calculated values. For example, in certain aspects, the values assigned to a first subclass are processed together and values assigned to a second subclass are processed together. Continuing with the example above, the calculated rust variable values are grouped into two groups: one group includes values that are classified in the surface="Rust" subclass and the other group includes values that are classified in the surface="shiny" subclass. At step 208, each group is provided to the SIMD interpreter as if a whole grid with the corresponding class information would be provided into the SIMD interpreter. Continuing with the example above, the SIMD interpreter will make the appropriate shading method call(s) associated with the particular subclass of the group. The output of the SIMD interpreter may then be used to render on a display device an image and/or the object. The routine completes at step 212.

Figure 3:
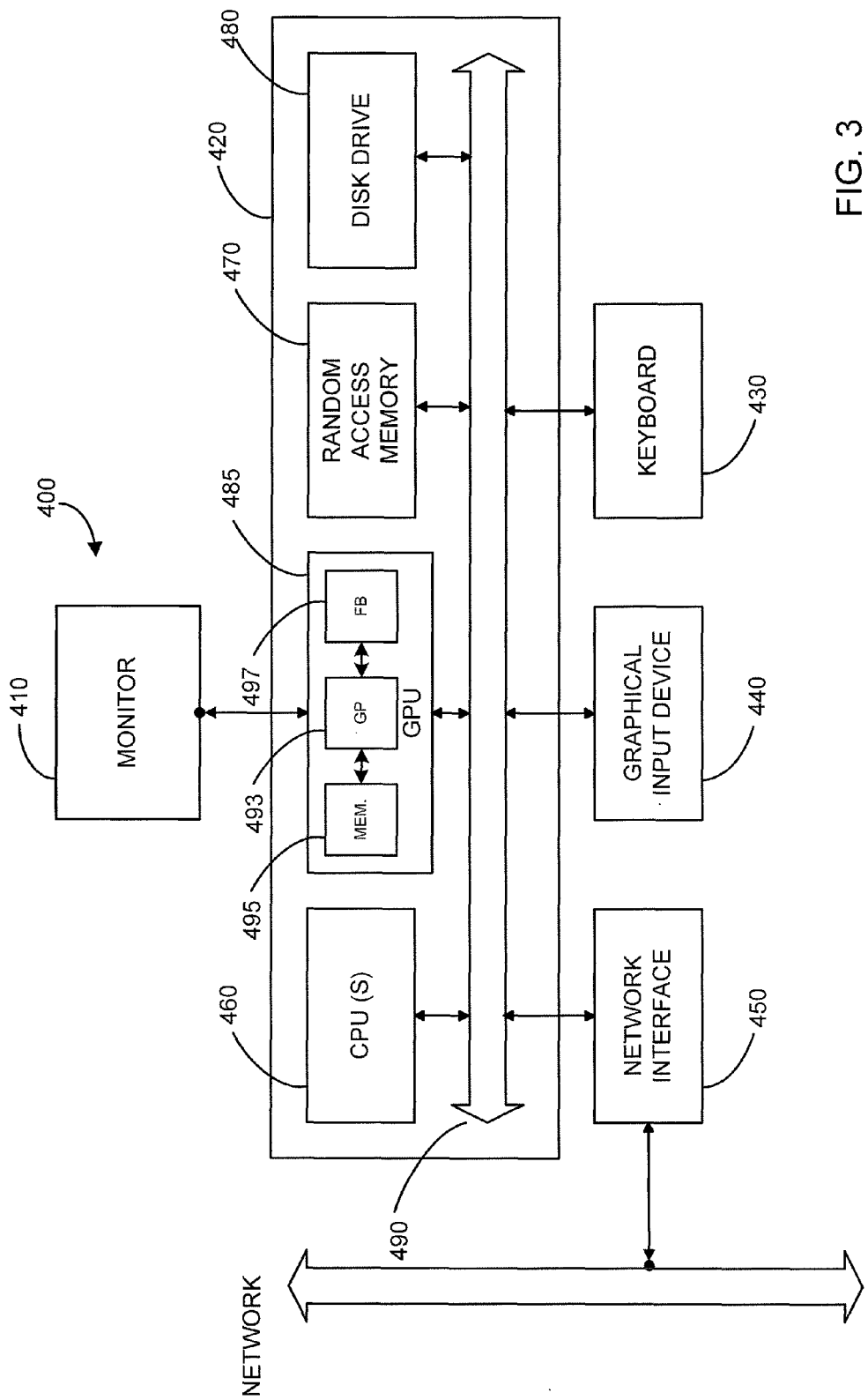
FIG. 3 is a block diagram of a computer system that may be used to practice various embodiments.

FIG. 3 is a block diagram of a computer system that may be used to practice embodiments of the present invention. FIG. 3 is merely illustrative of an embodiment incorporating the present invention and does not limit the scope of the invention as recited in the claims. One of ordinary skill in the art would recognize other variations, modifications, and alternatives.

In one embodiment, computer system 400 typically includes a monitor 410, computer 420, a keyboard 430, a user input device 440, computer interfaces 450, and the like.

In various embodiments, user input device 440 is typically embodied as a computer mouse, a trackball, a track pad, a joystick, wireless remote, drawing tablet, voice command system, eye tracking system, and the like. User input device 440 typically allows a user to select objects, icons, text and the like that appear on the monitor 410 via a command such as a click of a button or the like.

Embodiments of computer interfaces 450 typically include an Ethernet card, a modem (telephone, satellite, cable, ISDN), (asynchronous) digital subscriber line (DSL) unit, FireWire interface, USB interface, and the like. For example, computer interfaces 450 may be coupled to a computer network, to a FireWire bus, or the like. In other embodiments, computer interfaces 450 may be physically integrated on the motherboard of computer 420, and may be a software program, such as soft DSL, or the like.

In various embodiments, computer 420 typically includes familiar computer components such as a processor 460, and memory storage devices, such as a random access memory (RAM) 470, disk drives 480, a GPU 485, and system bus 490 interconnecting the above components.

In some embodiment, computer 420 includes one or more Xeon microprocessors from Intel. Further, one embodiment, computer 420 includes a UNIX-based operating system.

RAM 470 and disk drive 480 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like.

Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 400 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 485 may be any conventional graphics processing unit that may be user programmable. Such GPUs are available from NVIDIA, ATI, and other vendors. In this example, GPU 485 includes a graphics processor 493, a number of memories and/or registers 495, and a number of frame buffers 497.

FIG. 3 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

It should be appreciated that the SIMD shading language interpreter may be implemented in GPU 485 and/or CPU 460, and that various steps of the methods disclosed herein may be implemented in GPU 485 and/or CPU 460.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for managing execution of shading computations on computer graphics data, the method comprising:
   receiving, at one or more computer systems, a set of input primitives representing at least one geometric model, each input primitive in the set of input primitives associated with at least one base class defined in a shading language and a set of material property attributes each having at least one value defined on the input primitive;
   generating, with one or more processors associated with the one or more computer systems, a tessellation of at least one input primitive in the set of input primitives, the tessellation having a plurality of shading points, each shading point in the plurality of shading points having a set of values for a set of material property attributes inherited from the set of material property attributes associated with the at least one input primitive calculated from the at least one value defined on the at least one input primitive for each inherited material property attribute in the set of material property attributes associated with the at least one input primitive;
   assigning, with the one or more processors associated with the one or more computer systems, each value in the set of values for each shading point in the plurality of shading points to a subclass in a plurality of subclasses defined in the shading language of the at least one base class associated with the at least one input primitive based on the value in the set of values for the inherited material property attributes of the shading point and a predetermined set of one or more assignment conditions; and
   generating, with the one or more processors associated with the one or more computer systems, an execution group for at least one of the plurality of subclasses using each value in the set of values for each shading point in the plurality of shading points assigned to the at least one subclass.

2. The method of claim 1, further comprising providing the execution group for the at least one of the plurality of subclasses to a SIMD interpreter configured to shade the tessellation, wherein the set of calculated values for each shading point in a first group are processed together in a shading method according to a first subclass in the plurality of subclasses and the set of calculated values for each shading point in a second group are processed together in the shading method according to a second subclass in the plurality of subclasses.

3. The method of claim 1, wherein assigning, with the one or more processors associated with the one or more computer systems, each value in the set of values for each shading point in the plurality of shading points to a subclass in a plurality of subclasses defined in the shading language of the at least one base class associated with the at least one input primitive based on the value in the set of values for the inherited material property attributes of the shading point and a predetermined set of one or more conditions comprises:
   determining another set of calculated values; and
   assigning each value in the set of value for each shading point in the plurality of shading points to a subclass of the object class based on the another set of calculated values.

4. The method of claim 3, wherein the another set of calculated values are determined by an instruction in a shader.

5. The method of claim 1, wherein receiving, at the one or more computer systems, the computer graphics data for the at least one geometric model comprises receiving surface parameters for the at least one geometric model.

6. The method of claim 1, wherein receiving, at the one or more computer systems, the set of input primitives representing the at least one geometric model comprises receiving data representing one or more of colors, surface normals, textures, or illumination.

7. The method of claim 1, wherein receiving, at the one or more computer systems, the set of input primitives representing the at least one geometric model comprises receiving data representing vertices, edges or faces on an object mesh or grid.

8. The method of claim 1, further comprising:
   rendering, with the one or more processors associated with the one or more computer systems, an image of the at least one geometric model based on the execution group for the at least one of the plurality of subclasses.

9. A non-transitory computer-readable medium storing computer-executable code for managing execution of shading computations on computer graphics data, the non-transitory computer-readable medium comprising:
   code for receiving a set of input primitives representing at least one geometric model, each input primitive in the set of input primitives associated with at least one base class defined in a shading language and a set of material property attributes each having at least one value defined on the input primitive;

code for generating a tessellation of at least one input primitive in the set of input primitives, the tessellation having a plurality of shading points, each shading point in the plurality of shading points having a set of values for a set of material property attributes inherited from the set of material property attributes associated with the at least one input primitive calculated from the at least one value defined on the at least one input primitive for each inherited material property attribute in the set of material property attributes associated with the at least one input primitive;

code for assigning each value in the set of values for each shading point in the plurality of shading points to a subclass in a plurality of subclasses defined in the shading language of the at least one base class associated with the at least one input primitive based on the value in the set of values for the inherited material property attributes of the shading point and a predetermined set of one or more conditions; and code for generating an execution group for at least one of the plurality of subclasses using each value assigned to the at least one subclass.

10. The non-transitory computer-readable medium of claim 9, further comprising code for providing the execution group for the at least one of the plurality of subclasses to a SIMD interpreter configured to shade the tessellation, wherein the set of calculated values for each shading point in a first group are processed together in a shading method according to a first subclass in the plurality of subclasses and the set of calculated values for each shading point in a second group are processed together in the shading method according to a second subclass in the plurality of subclasses.

11. The non-transitory computer-readable medium of claim 9, wherein the code for assigning each value in the set of values for each shading point in the plurality of shading points to a subclass in a plurality of subclasses defined in the shading language of the at least one base class associated with the at least one input primitive based on the value in the set of values for the inherited material property attributes of the shading point and a predetermined set of one or more conditions comprises:

code for determining another set of calculated values; and code for assigning each value in the set of value for each shading point in the plurality of shading points to a subclass of the object class based on the another set of calculated values.

12. The non-transitory computer-readable medium of claim 11, wherein the another set of calculated values are determined by an instruction in a shader.

13. The non-transitory computer-readable medium of claim 9, wherein the code for receiving the computer graphics data for the at least one geometric model comprises code for receiving surface parameters for the at least one geometric model.

14. The non-transitory computer-readable medium of claim 9, wherein the code for receiving the set of input primitives representing the at least one geometric model comprises receiving data representing one or more of colors, surface normals, textures, or illumination.

15. The non-transitory computer-readable medium of claim 9, wherein the code for receiving the set of input primitives representing the at least one geometric model comprises receiving data representing vertices, edges or faces on an object mesh or grid.

16. The non-transitory computer-readable medium of claim 9, further comprising:

code for rendering an image of the at least one geometric model based on the execution group for the at least one of the plurality of subclasses.

17. A non-transitory computer-readable medium storing computer-executable code for managing execution of shading computations on computer graphics data, the non-transitory computer-readable medium comprising:

code for receiving computer graphics data for a model, at least some vertices of the model associated a base class of a shading method configured to determine a color value of a point based on a set of values for each material property attribute specified at the point;

code for calculating a set of one or more values for each material property attribute at each of a plurality of shading points determined for the model based on an interpolation of the computer graphics data;

code for assigning the set of one or more values calculated for each material property attribute at each of the plurality of shading points into at least one subclass in a plurality of subclasses of the at least one base class of the shading method based on the set of one or more values calculated for the shading point and a predetermined set of one or more conditions on material property attribute values; and code for generating execution groups of a SIMD interpreter that shades the model according to the shading method, wherein the set of one or more values calculated for each shading point in a first execution group are processed together in the shading method according to a first subclass in the plurality of subclasses and the set of one or more values calculated for each shading point in a second execution group are processed together in the shading method according to a second subclass in the plurality of subclasses.

* * * * *

UNITED STATES PATENT AND TRADEMARK OFFICE
CERTIFICATE OF CORRECTION

PATENT NO.        : 8,970,588 B1                              Page 1 of 1
APPLICATION NO.   : 12/533965
DATED             : March 3, 2015
INVENTOR(S)       : Thomas Douglas Selkirk Duff It is certified that error appears in the above-identified patent and that said Letters Patent is hereby corrected as shown below:

In the Claims

At column 8, line 37
    Please remove "value in the set of value" and insert -- "value in the set of values" --

At column 9, line 47
    Please remove "value in the set of value" and insert -- "value in the set of values" --

Signed and Sealed this
Twenty-third Day of June, 2015

Michelle K. Lee
*Director of the United States Patent and Trademark Office*